United States Patent [19]

Kako

[11] 4,408,767
[45] Oct. 11, 1983

[54] SHAFT SEALING DEVICES FOR HYDRAULIC MACHINES

[75] Inventor: Takuya Kako, Tokyo, Japan

[73] Assignee: Tokyo Shibaura Denki Kabushiki Kaisha, Kanagawa, Japan

[21] Appl. No.: 338,970

[22] Filed: Jan. 12, 1982

Related U.S. Application Data

[63] Continuation of Ser. No. 152,316, May 22, 1980, abandoned.

[30] Foreign Application Priority Data

May 31, 1979 [JP] Japan .................................. 54-67759

[51] Int. Cl.³ .............................................. F16J 15/40
[52] U.S. Cl. ..................................... 277/27; 277/199; 277/DIG. 6
[58] Field of Search ..................... 277/27, DIG. 6, 199

[56] References Cited

U.S. PATENT DOCUMENTS 3,305,241  2/1967  Hart .................................... 277/199
4,329,127  5/1982  Tschirky et al. ...................... 277/27

FOREIGN PATENT DOCUMENTS 1191647  5/1970  United Kingdom ......... 277/DIG. 6

Primary Examiner—Robert I. Smith
Attorney, Agent, or Firm—Stevens, Davis, Miller & Mosher

[57] ABSTRACT

In a shaft sealing device for a hydraulic machine, a packing box is provided about a rotatable shaft of the hydraulic machine. A number of packings are encased in the packing box so that the sliding surfaces of the packings are urged against the movable shaft. Each of the packings is made of tetrafluoroethylene resin mixed with a filler, and molded under a pressure into a desired shape. The filler is selected from the group consisting of carbon powder, graphite powder, carbon fibers, glass fibers, and bronze powder, and combinations thereof.

3 Claims, 13 Drawing Figures

FIG. I
PRIOR ART

SHAFT SEALING DEVICES FOR HYDRAULIC MACHINES

This is a continuation of application Ser. No. 152,316 filed May 22, 1980 and now abandoned.

BACKGROUND OF THE INVENTION

This invention relates to a shaft sealing device for a hydraulic machine, and more particularly to such device of the type adapted for preventing water from leaking out along the shaft of a hydraulic machine such as a hydraulic turbine or pump.

A shaft sealing device including packings is used between a fixed structural member and a movable shaft rotatable about its axis or reciprocatable along its length, for sealing a space between the two machine and for preventing water or the like fluid from leaking out of the space.

In the above described application, although a pressure exerted radially inwardly to the outer surface of each packing is essential for ensuring the shaft pressure to each packing tends to restrict the movement of the shaft, accelerates wear of the packings and the shaft surface, and in the worst case, causes shaft seizure.

FIG. 1 shows one example of a conventional shaft sealing device applied to a hudraulic turbine, the latter comprising a spiral casing 1, a shaft 6, and a runner 3 secured to the shaft 6 to be rotatable in the casing 1. The pressurized water in the spiral casing 1 is passed through a guide vane 2 toward the runner 3 to drive the same, and the pressurized water exhausted is discharged through a draft tube (not shown) to a tail race. Simultaneously, a portion of the pressurized water is caused to flow upward through a gap between the runner 3 and the head cover 4 of the turbine into a space defined by the outer surfaces of the shaft 6 and the head cover 4. A shaft sealing device 7 is provided between the shaft 6 and the head cover 4 for preventing water from leaking out through a gap between the two members 6 and 4.

As shown in detail in FIG. 2, the shaft sealing device 7 comprises a packing box 9 secured to the head cover 4 by means of bolts 8, packings $10_a$, $10_b$, and $10_c$ contained in the packing box 9 at positions vertically aligned along the shaft 6, retainers 11 provided respectively radially outwardly of the packings $10_a$, $10_b$, $10_c$ and garter springs 12 respectively provided about the outer circumferences of the retainers 11 for urging the retainers 11 toward the shaft 6.

Among the above described packings $10_a$, $10_b$, and $10_c$, packings $10_a$ and $10_b$ provided at the upper side are carbon packings ordinarily containing furan and sintered, while a packing $10_c$ provided at the lower side is a resin packing ordinarily made of phenolic resin.

Each of the packings $10_a$, $10_b$, and $10_c$ is divided along its circumference into a plurality of packing pieces as shown in FIG. 3. Each packing piece has a projection 14 at a circumferential end and also a recess 15 at the other circumferential end thereof. When the packing pieces are arranged circumferentially about the shaft 6 so that the inner surfaces of the packing pieces are brought into contact with a sleeve 16 tightly fitted about the shaft 6, the projection 14 of one packing piece is received in the recess 15 of an adjacent packing piece as shown in the drawing, leaving a gap g between the opposing end surfaces.

A fresh water supply hole 17 is provided in the packing box 9 to pass through a portion thereof between the packings $10_b$ and $10_c$. A water feed pipe 18 is connected with the hole 17 for supplying fresh water throughout the sliding surfaces of the packings between a flange 19 of the shaft 6 and the packing box 9, or a pressure higher than that of the chamber 20 by 1–2 kg/cm².

By the supply of the pressurized fresh water, any possibility of mud or sand from flowing upwardly into the sealing device and the packings and the possibility of overheating and wearing can be substantially eliminated.

Above the packing box 9, there is provided a water splashing plate 21 which splashes the water which leaks through the packings away from the shaft and prevents the water from entering into a bearing 22 provided above the shaft sealing device 7.

However, in the above described conventional shaft sealing device utilizing carbon packings $10_a$ and $10_b$ and a resin packing $10_c$, it has been found that the upper limit of the shaft sealing pressure of the carbon packings $10_a$ and $10_b$ is approximately 5 kg/cm², and the shaft sealing pressure of the resin packing $10_c$ is less than 3 kg/cm² per one stage of the packing. For this reason a great number of packing stages are required for a high-pressure hydraulic turbine, thus resulting in an increase in a distance L between the center of the runner 3 and the center of the bearing 22 as shown in FIG. 1.

The increase of the distance L increases the overhang of the shaft projecting downwardly beyond the bearing 22, thus increasing the degree of the shaft deflection thereof and causing the operation of the turbine to be unstable.

Furthermore, the conventional carbon packing is easily broken because of its brittleness and tends to be worn out by mud and sand entering into the shaft sealing device. Augmenting the section modulus of the carbon packing for the purpose of strengthening the same inevitably increases the size of the packings and hence the distance L between the runner and the bearing.

SUMMARY OF THE INVENTION

An object of the present invention is to provide a shaft sealing device for a hydraulic machine, wherein the shaft sealing pressure of each packing is substantially increased, and a shaft sealing capability of the device can be retained for a long time while reducing the number of the packings.

Another object of the invention is to provide a shaft sealing device for a hydraulic machine, which includes packings that are not readily broken or worn out by mud or sand entering into the shaft sealing device.

Still another object of the invention is to provide a shaft sealing device for a hydraulic machine, wherein fresh water is introduced to seal the shaft against leakage therealong of a pressurized air.

These and other objects of the invention can be achieved by providing a shaft sealing device for a hydraulic machine, comprising a packing box provided about a rotatable shaft of the machine, a number of packings encased in the packing box so that the sliding surfaces of the packings are urged against the movable shaft, characterized in that each of the packings is made of tetrafluoroethylene resin mixed with a filler and molded under a pressure into a desired shape.

In a preferred embodiment of the invention, each of the packings is made of 40 to 90 wt. % of tetrafluoroethylene resin and a filler of the remaining wt. % selected from carbon powder, graphite powder, carbon fibers, glass fibers, and bronze powder, or combinations thereof.

In another embodiment of the invention, the shaft sealing device of the above described construction further comprises a water supplying means capable of supplying water to the surfaces of the packings slidably contacting with the rotatable shaft.

In still another embodiment of the invention, each of the packings is circumferentially divided into a number of packing pieces which are interconnected with each other in a tenon-and-mortise relation while maintaining a gap between two adjacent packing pieces.

DESCRIPTION OF THE PREFERRED EMBODIMENTS

Figure 5:
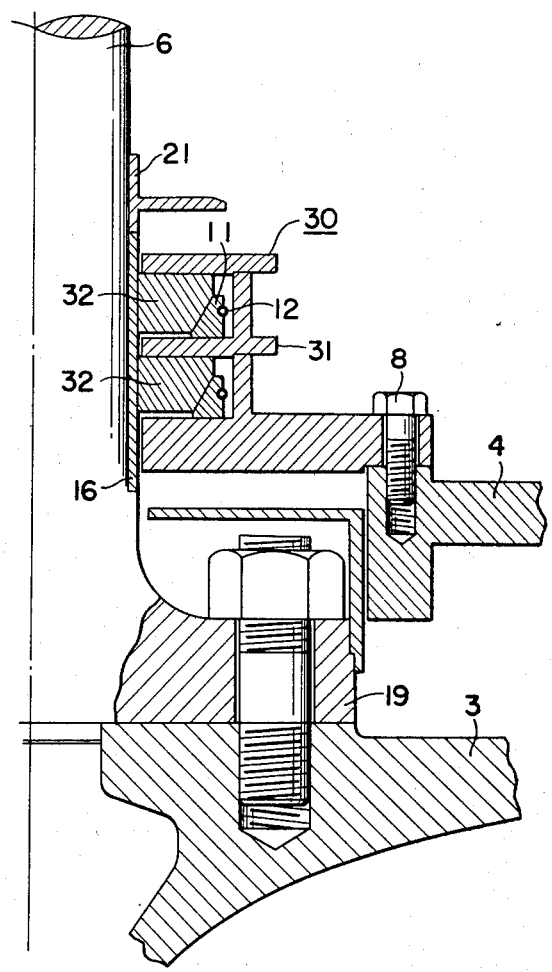
FIG. 5 is a longitudinal sectional view of a shaft sealing device according to the present invention.

Referring now to FIG. 5, there is illustrated an embodiment of the present invention wherein parts similar to those in FIGS. 1 through 4 are designated by like reference numerals.

A shaft sealing device generally designated by a reference numeral 30 in FIG. 5 comprises a packing box 31 of two stages provided between a head cover 4 and a shaft 6 of a hydraulic turbine (or a reversible pump/turbine). Packings 32 are contained in the two stage packing box 31. A retainer 11 is provided radially outwardly of each packing 32. A garter spring 12 extending around the retainer 11 urges the retainer 11 and the packing 32 toward the shaft 6.

According to the present invention, the packing 32 is made of 40 to 90 wt. % of tetrafluoroethylene resin mixed with a filler of remaining wt. % which is selected from the group consisting of carbon powder, graphite powder, carbon fibers, glass fibers, bronze powder, and the like and combinations thereof. When it is required, a trace of a lubricant such as molybdenum disulfide is added to the above described mixture. The resulting mixture is then molded under pressure and is cut and shaped into packing pieces of a configuration of, for instance, shown in FIG. 3. Each of the packings and the retainer 11 placed in the packing box 31 are urged by the garter spring 12 toward a sleeve 16 which is force fitted about the shaft 6. Because of the tapered contacting surfaces between the retainer 11 and the packing 32, the packing 32 is further urged toward the upper wall of the packing box 31.

Since the packing 32 made of tetrafluoroethylene mixed with a filler and press-molded as described above has a high affinity with water, a water film can be maintained between the sleeve 16 about the shaft 6 and the sliding surface of the packing 32. As a result, the shaft 6 is rotated under a water-lubricated condition, and the water leaking along the sliding surface of the packing is limited regardless of an application of a comparatively high water pressure.

Furthermore, because the packing of the shaft-sealing device according to the present invention is made of tetrafluoroethylene resin mixed with a filler, the packing can stand against a high shaft sealing pressure (a pressure difference presented across a packing) of more than 15 kg/cm$^2$ per one stage of packing, while maintaining a high wear resistivity.

In addition, because of a low modulus of elasticity under tension of the packing material (in a range of from $1.3 \times 10^4$ to $2.0 \times 10^4$ kg/cm$^2$), the packing is hardly broken, and therefore the section modulus thereof can be substantially reduced.

For this reason, not only the size of each packing but also the number of the packings, and also the size of the packing box can be reduced, thus reducing the size of the entire shaft-sealing device.

More specifically, a conventional packing having an axial height of 50 to 60 mm can be replaced by a packing according to this invention having an axial height of approximately 25 mm, and the reduction in size of the shaft-sealing device in turn reduces the distance L (refer to FIG. 1) between the center of the runner 3 and the center of the bearing 22. Thus, the projecting length of the shaft is substantially reduced to stabilize the operation of the turbine, and the maintenance of the turbine is simplified.

While varying the pressure P applied radially inwardly to the outer surface of the packing, the amount Q of water leakage and the amount of wear were measured for a packing according to this invention and a packing of a conventional construction (made of carbon). The packing according to this invention was made of Teflon (Trade Name of Dupont Co.) of about 70 wt. % mixed with carbon powder of about 30 wt. %, the mixture being press-molded into a configuration having an axial height of 25 mm, and an inner diameter adapted to be in a sliding contact with a shaft sleeve of 200 mm outer diameter.

Figure 6:
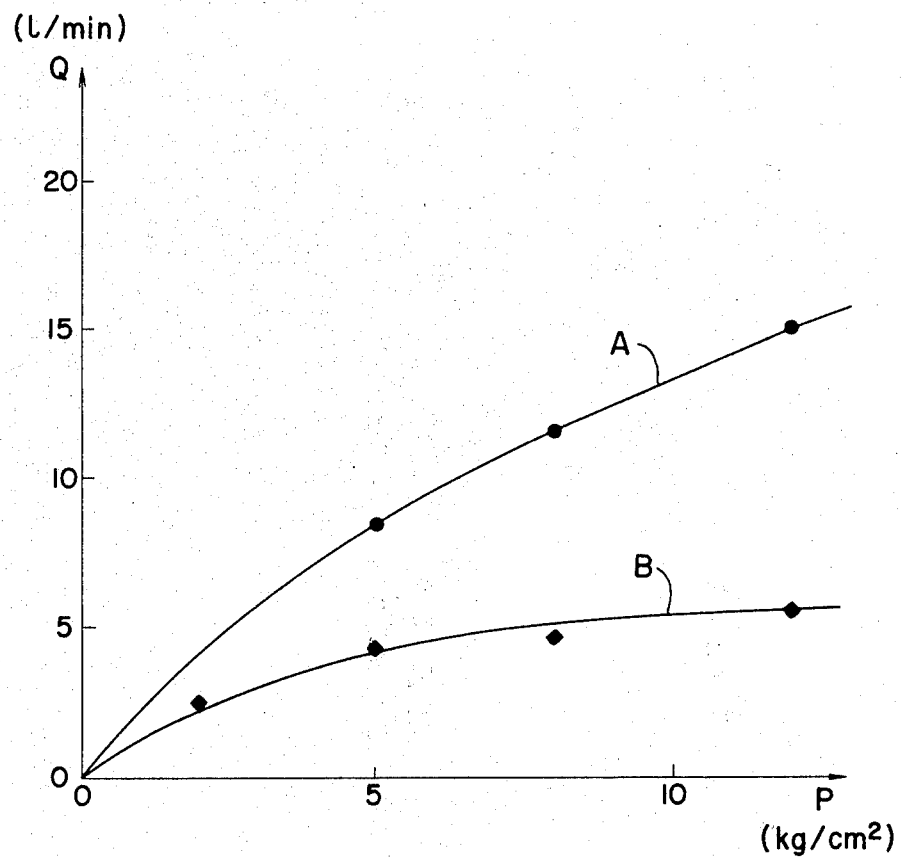
FIG. 6 is a graphical representation of leakage-pressure characteristics of a conventional packing and a packing according to the present invention.

From the above described measurement, it was found that the water leakage Q through the packing of this invention was in a range of from ½ to ⅓ of the leakage through the conventional packing, and also that the wear of the packing of this invention was reduced to ⅓ of that of the conventional packing. It was also found that the maximum shaft sealing pressure per one stage of packing was more than 15 kg/cm$^2$, and that the maximum peripheral speed of the shaft was more than 40 m/sec. Curve A in FIG. 6 shows the measured results of the water leakage Q for the packing of this invention and curve B that of the conventional packing against pressure P applied radially inwardly to the outer surface of the packing.

The packing according to the invention has a comparatively high thermal conductivity, thus reducing temperature rise due to friction and preventing the occurrence of fretting and corrosion on the sliding surface of the packing.

Figure 2:
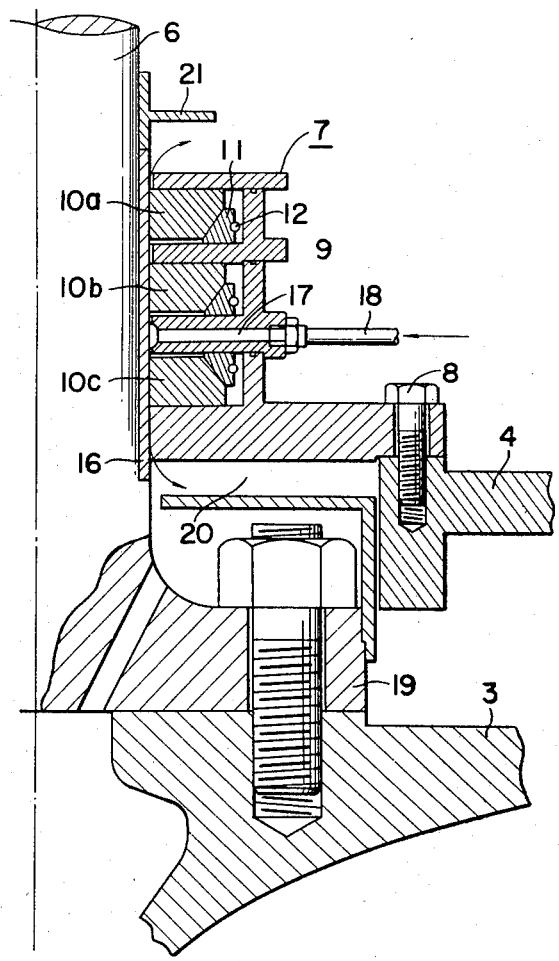
FIG. 2 is a longitudinal sectional view showing the detail of the conventional shaft-sealing device shown in FIG. 1.
Figure 3:
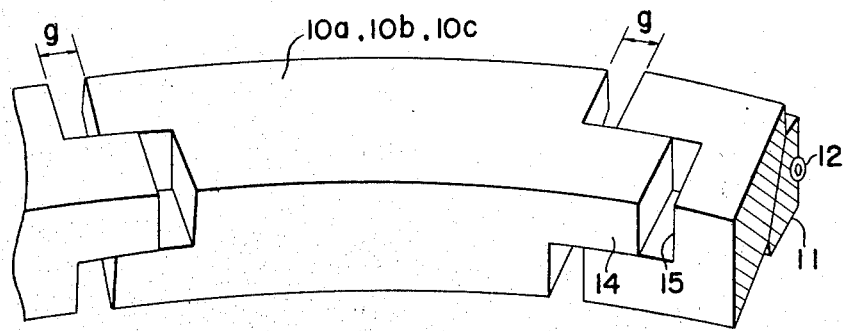
FIG. 3 is a perspective view showing, on a greatly enlarged scale, a packing divided into a plurality of packing pieces.
Figure 4:
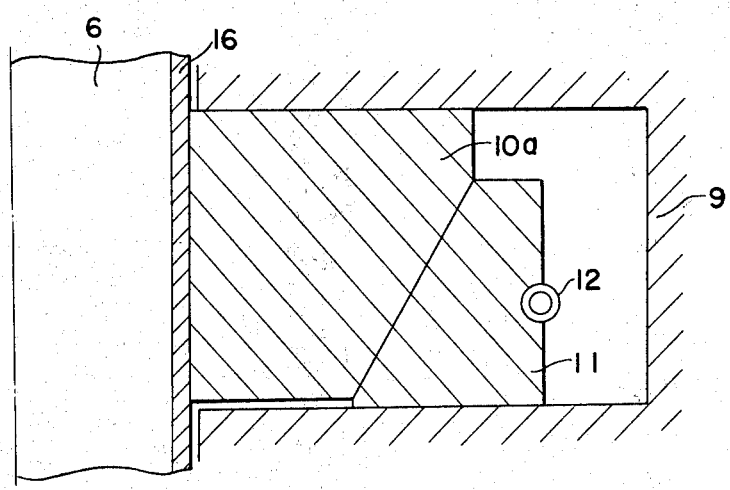
FIG. 4 is a longitudinal sectional view showing, on a much enlarged scale, an arrangement of the conventional packing.

Furthermore, the packing according to this invention is comparatively soft (falling in a range of from D65 to D68 when measured by a durometer), thus requiring no fresh water supplying device 17 and 18 as shown in FIG. 2 for the protection of the sliding surfaces of the shaft sleeve and the packing from being worn out by water containing mud or sand. Accordingly, the fresh water supplying device 17 and 18 as well as the resin packing $10_c$ for protecting the carbon packings $10_a$ and $10_b$ as shown in FIG. 2 can be entirely omitted, thus simplifying the construction of the shaft-sealing device.

Figure 7:
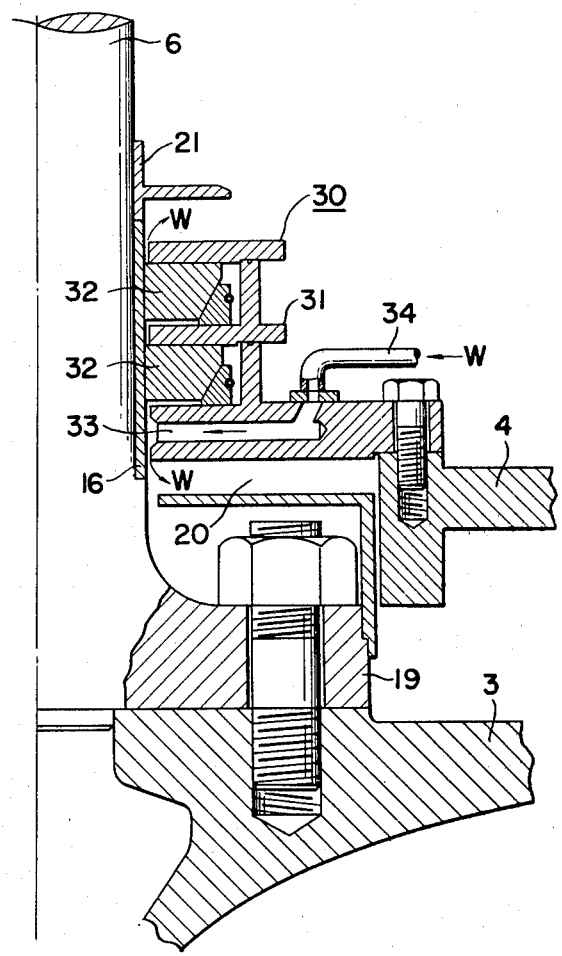
FIG. 7 is a longitudinal sectional view showing another embodiment of the present invention.

In FIG. 7 there is illustrated another embodiment of the present invention wherein members and parts similar to those shown in FIG. 5 are designated by like reference numerals, for the purpose of eliminating repeated description thereof.

In this embodiment, a water feed hole 33 is provided through a portion between the packing box 31 and the pressurized chamber 20. A water feed pipe 34 is connected to the hole 33 so that water W can be supplied therethrough to the peripheral surface of the shaft sleeve 16. When the runner of the reversible pump/turbine is rotated in compressed air for initiating its pumping up operation, or for driving the tubine in a condenser operation, the water W thus supplied is used for preventing the compressed air from leaking out through the shaft-sealing device. For this purpose, the water W need not necessarily be fresh water as in the case of FIG. 2.

FIGS. 8 through 13 show various modifications of the packing according to this invention, wherein members and parts similar to those shown in FIG. 5 are designated by like reference numerals.

For the purpose of improving the water-resistance of the packing and elongating the operational life thereof, a water passage of various construction is provided in the sliding surface of a packing 32 made of a material similar to that of the embodiment shown in FIG. 5, so that the water in the turbine casing at a pressure $P_1$ is introduced through the water passage to the sliding surface of the packing.

Figure 1:
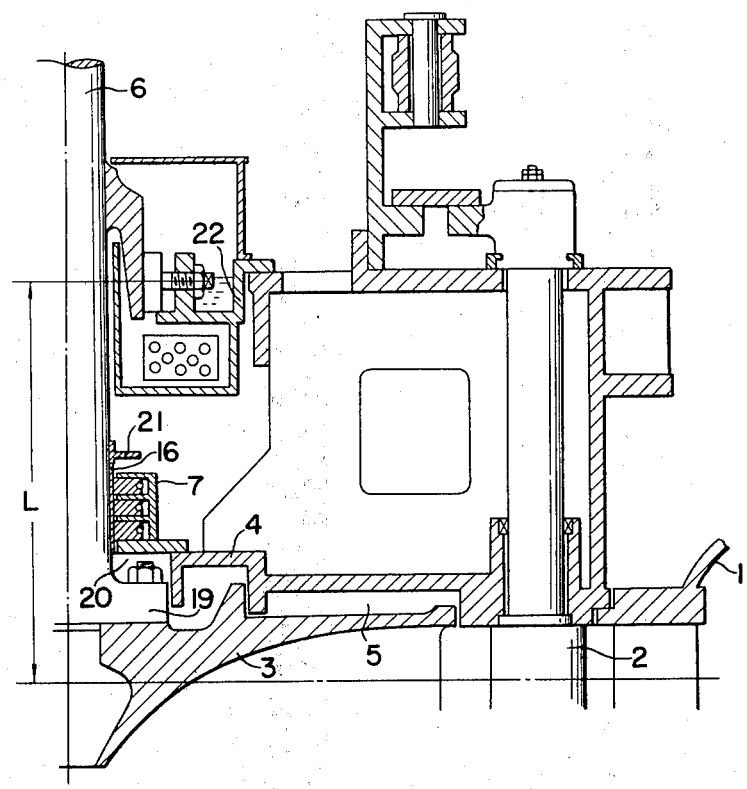
FIG. 1 is a longitudinal sectional view showing a portion of a conventional hydraulic turbine.
Figure 8:
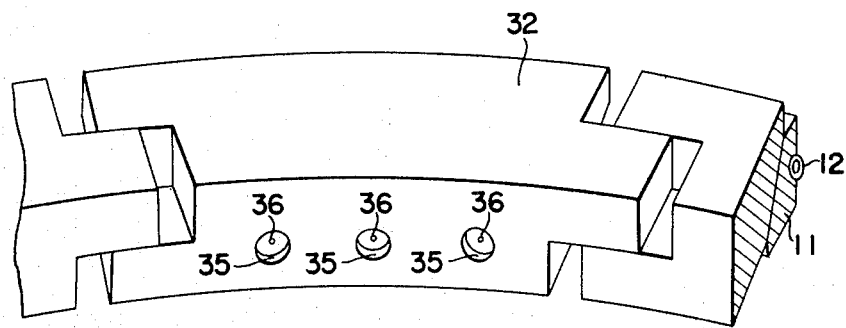
FIGS. 8, 10, and 12 are perspective views showing various modifications of the packing.
Figure 9:
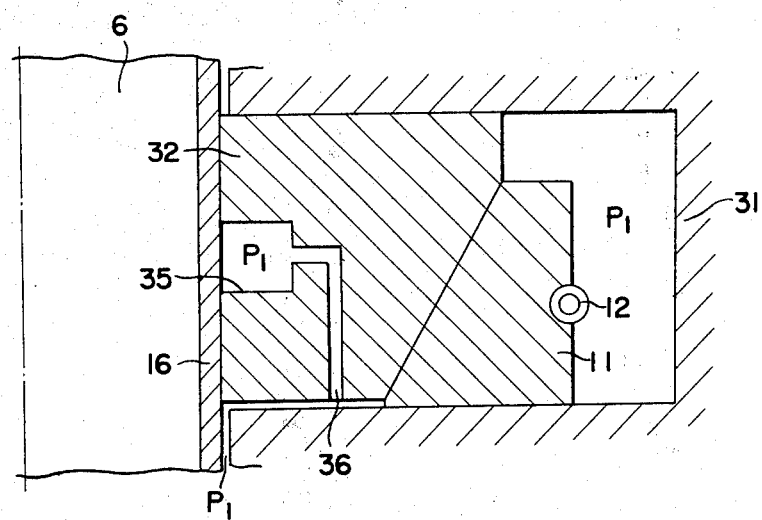
FIGS. 9, 11, and 13 are longitudinal sectional views showing the arrangements of these modifications.

More specifically, a packing 32 is divided into a number of packing pieces as shown in FIGS. 8 and 9, and each packing piece is provided with a plurality of round holes 35 bored through the sliding surface at an intermediate portion thereof, and also a required number of through holes 36 bored through the packing pieces to communicate the round holes 35 with the pressurized chamber 20 (see FIGS. 1 and 2). Through these holes, water in the chamber 20 pressurized to a pressure $P_1$ is supplied onto the sliding surface of the packing thereby improving the cooling effect and forming a stable water film between the sliding surfaces, while reducing the wear of the packings and elongating the operational life thereof when the compressive forces exerted to the packings from outside are reduced suitably.

Figure 10:
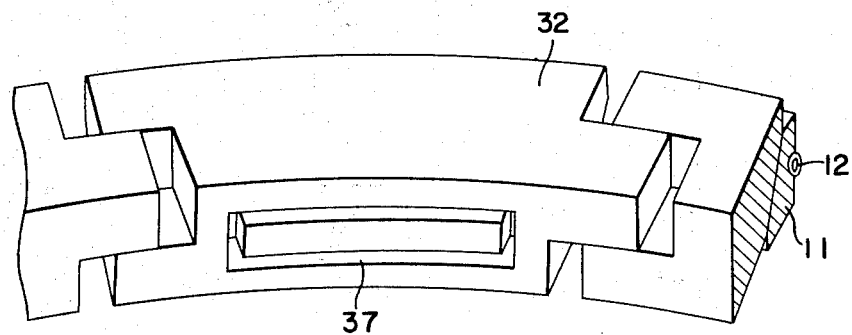
Figure 11:
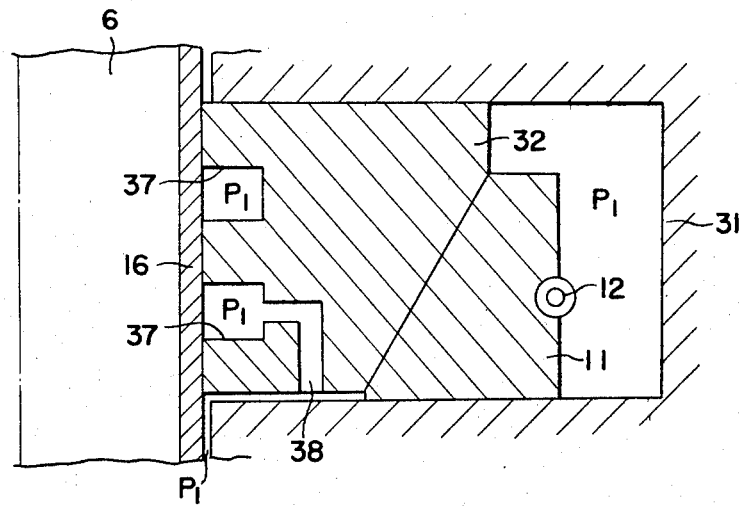

In another example of the packing shown in FIGS. 10 and 11, a rectangular groove 37 is provided in the sliding surface of each packing piece in a middle portion thereof, and a through hole 38 is also provided through the packing piece to communicate the rectangular groove 37 with the pressurized chamber 20 for supplying pressurized water of a pressure $P_1$ from the chamber 20 to the groove 37. This example of the packing affords advantageous effect substantially equal to that of the example shown in FIGS. 8 and 9.

Figure 12:
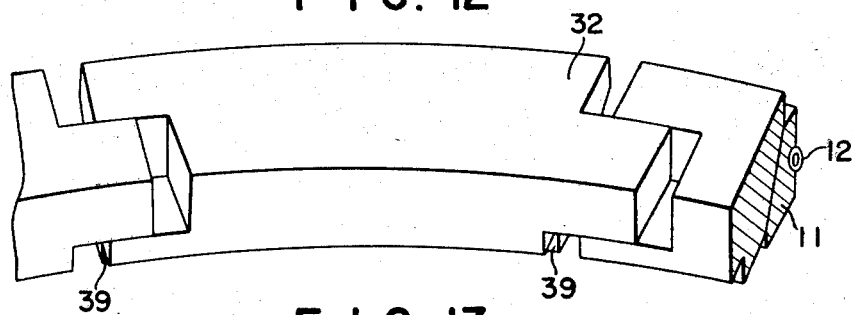
Figure 13:
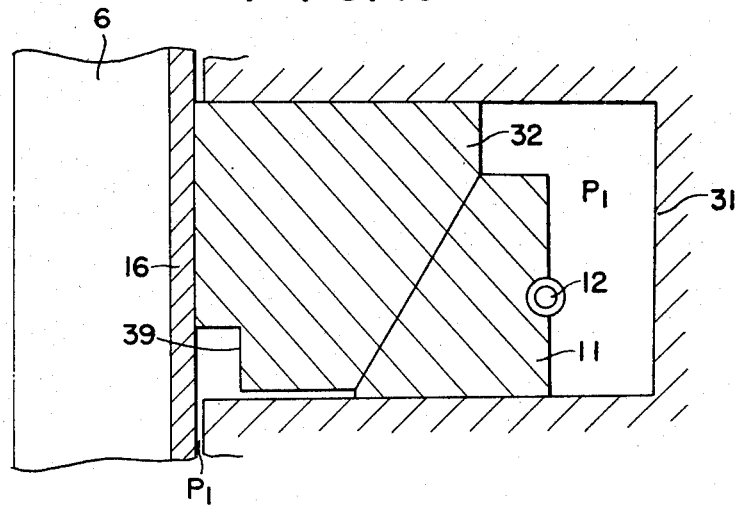

Still another example shown in FIGS. 12 and 13 is provided with a cut-off portion 39 along a high-pressure side edge of the sliding surface of each packing piece, and also with a provision to supply pressurized water into the cut-off portion 39. With this example also, it is apparent that an advantageous effect similar to that of the example shown in FIGS. 8 and 9 can be attained.

Although the present invention has been described with respect to a multistage shaft sealing device of a used for a hydraulic turbine or pump, it will be apparent to those skilled in the art that the invention is further applicable to a single-stage shaft sealing device such as a mechanical seal to be used for a hydraulic machine.

I claim:

1. In a shaft sealing device for a hydraulic machine comprising a packing box provided about a rotatable shaft of the hydraulic machine, said shaft being connected to a runner of said machine, and a number of packings encased in the packing box so that sliding surfaces of the packings are urged against the rotatable shaft for preventing water in a high-pressure space of the hydraulic machine adjacent said packing box from leaking out through gaps between the sliding surfaces of the packings and the rotatable shaft, the improvement wherein said shaft sealing device further comprises water supply means opening intermediately between said packing box and said high-pressure space for supplying water from a source of water at least at a time when said runner of the hydraulic machine is rotated in compressed air, passage means for guiding the thus supplied water to the sliding surfaces of said packings, said supplied water preventing compressed air from leaking out through said shaft sealing device, each of said packings being provided with a cutoff portion along a high pressure side edge of its sliding surface and each of said packings being made of 40 to 90 wt. % of tetrafluoroethylene resin mixed with a filler of the remaining wt. % and molded under a pressure into a predetermined shape.

2. A shaft sealing device as set forth in claim 1 wherein each of said packings is provided with a number of rectangular grooves provided in the sliding surface, and with passages formed through the packing for supplying pressurized water into the rectangular grooves.

3. A shaft sealing device as set forth in claim 1 wherein each of said packings is provided with a number of round holes bored through the sliding surface, and with passage formed through the packing for supplying pressurized water into the round holes.

* * * * *